(12) United States Patent
Yetukuri et al.

(10) Patent No.: US 7,178,865 B2
(45) Date of Patent: Feb. 20, 2007

(54) CENTER OCCUPANT ARMREST ACTUATED HEAD RESTRAINT

(75) Inventors: Nagarjun Yetukuri, Rochester Hills, MI (US); Gerald S. Locke, Lake Orion, MI (US); Kar K. Low, Southfield, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 119 days.

(21) Appl. No.: 10/711,557

(22) Filed: Sep. 24, 2004

(65) Prior Publication Data

US 2006/0071529 A1    Apr. 6, 2006

(51) Int. Cl.
*B60N 2/46* (2006.01)
*A47C 7/36* (2006.01)
*A47C 7/38* (2006.01)

(52) U.S. Cl. .............. 297/113; 297/112; 297/115; 297/117; 297/411.2; 297/411.3; 297/411.32; 297/411.46; 297/410; 297/238

(58) Field of Classification Search ............... 297/112, 297/113, 115, 117, 411.2, 411.25, 411.3, 297/411.32, 411.46, 410, 238
See application file for complete search history.

(56) References Cited

U.S. PATENT DOCUMENTS

| | | | | |
|---|---|---|---|---|
| 5,433,503 A | * | 7/1995 | De Filippo | ............... 297/115 |
| 5,540,479 A | * | 7/1996 | Thomas et al. | ............. 297/113 |
| 5,590,933 A | | 1/1997 | Andersson | |
| 5,628,543 A | * | 5/1997 | Filipovich et al. | .......... 297/113 |
| 5,669,668 A | | 9/1997 | Leuchtmann | |
| 5,700,054 A | * | 12/1997 | Lang | ...................... 297/112 X |
| 5,704,685 A | * | 1/1998 | Handa et al. | ........... 297/410 X |
| 6,000,760 A | | 12/1999 | Chung | |
| 6,050,633 A | | 4/2000 | Droual | |
| 6,508,512 B2 | | 1/2003 | Saberan et al. | |
| 6,550,865 B2 | | 4/2003 | Cho | |
| 6,572,188 B2 | * | 6/2003 | Ozawa | .............. 297/411.32 X |
| 6,616,236 B1 | | 9/2003 | Su | |

(Continued)

FOREIGN PATENT DOCUMENTS

DE           3436509 A1 * 4/1986 .................. 297/115

(Continued)

*Primary Examiner*—Rodney B. White
(74) *Attorney, Agent, or Firm*—Earl LaFontaine, Esq.; Artz & Artz, P.C.

(57) ABSTRACT

An automotive seat assembly is provided including a left rear seat portion including a left rear seat base and a left rear seatback, a right rear seat portion including a right rear seat base and a right rear seatback, and a center rear seat portion including a center rear seat base and a center rear seatback. A head restraint assembly is mounted to the center rear seatback and defines a head restraint protrusion distance above the upper seatback surface. The head restraint assembly is movable between a head restraint operational position and a head restraint stowed position. The head restraint stowed position reduces the head restraint protrusion distance for improved visibility. A convenience feature assembly is formed within the center rear seatback and is movable between an convenience feature stowed position and an convenience feature deployed position. The convenience feature assembly is in communication with the head restraint assembly such that it is moved between the head restraint stowed position and the head restraint operational position in response to the armrest assembly moving between the armrest deployed position and the armrest stowed position.

15 Claims, 4 Drawing Sheets

U.S. PATENT DOCUMENTS

| | | |
|---|---|---|
| 6,655,733 B2 | 12/2003 | Humer et al. |
| 6,663,181 B2 | 12/2003 | Nygren et al. |
| 6,722,740 B2 | 4/2004 | Imayou et al. |
| 6,726,283 B2 | 4/2004 | Schambre et al. |

FOREIGN PATENT DOCUMENTS

| | | | | |
|---|---|---|---|---|
| DE | 4015872 C1 | * | 1/1992 | ................ 297/113 |
| EP | 571097 A1 | * | 11/1993 | ................ 297/113 |
| JP | 06135271 A | * | 5/1994 | ................ 297/238 |
| JP | 06135273 A | * | 5/1994 | ................ 297/238 |
| JP | 06156130 A | * | 6/1994 | ................ 297/238 |
| JP | 06286509 A | * | 10/1994 | ................ 297/238 |
| JP | 06286510 A | * | 10/1994 | ................ 297/238 |

* cited by examiner

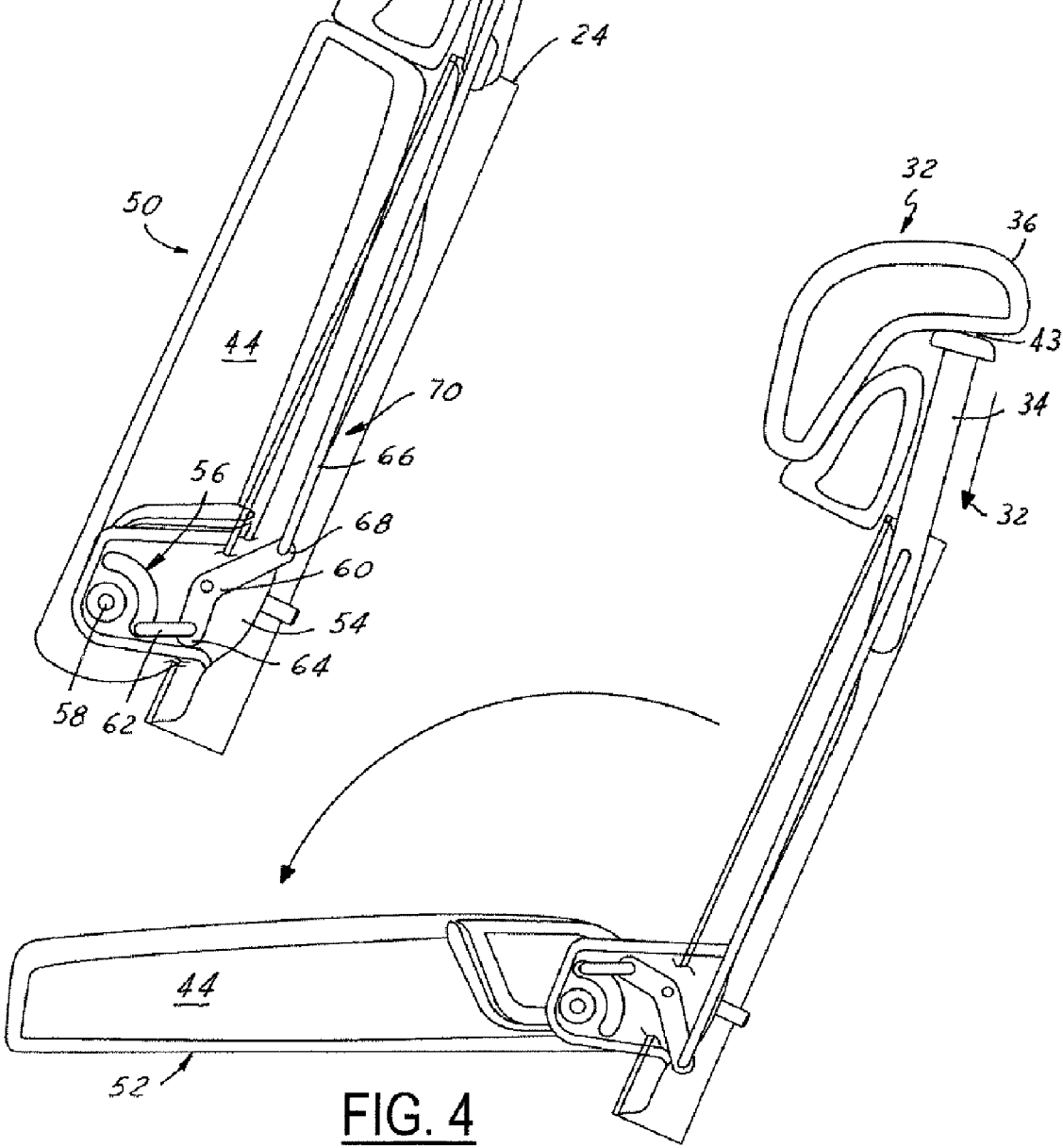

CENTER OCCUPANT ARMREST ACTUATED HEAD RESTRAINT

TECHNICAL FIELD

The present invention relates generally to an automotive seat assembly and more particularly to an automotive seat assembly with an improved in-vehicle visibility by way of an occupant actuated head restraint assembly.

BACKGROUND OF THE INVENTION

The principles of design dictate that simplicity of operation is often of the highest importance. This principle is often overlooked within the arena of automotive design. Features within automobiles must often provide a variety of features and function from safety, to comfort, to convenience. Additionally, automotive features must often be flexible enough to provide for numerous operational uses of the vehicle. This may include the ability to alternate between passengers and storage or even a varying number of passengers. As a result, safety features such as seat belts and head restraints are commonly arranged for maximum passenger capacity. Often, however, such maximum passenger capacity is not realized and these features remain un-utilized.

Under utilized features can represent a loss in efficiency in design. This loss in efficiency, however, is commonly an acceptable trade-off for the increased flexibility of use these features bring. It is highly desirable for such features to present minimal impact on the overall functionality of the vehicle when not in use. Such is the case with headrest assemblies. Head restraint assemblies provide valuable comfort and safety features for passengers. As such, they are often implemented in automotive rear seat assemblies. These rear seat assemblies, especially center seating, are often un-utilized. The head restraints in these cases fail to provide any passenger benefit, and yet may remain positioned in between the driver's mirror and portions of the rear window. Thus, the head restraints, when not in use, impact design efficiency.

It would be highly desirable to have a head restraint assembly that could be adjusted, when not in use, to minimize its profile within the rear window. It would furthermore be highly desirable to have such an adjustable head restraint assembly be tied in to other features within the automobile that indicate whether the head restraint assembly is being utilized or not. In this fashion, the head restraint assembly could be moved automatically between a stored and deployed position without complex driver operated controls. Additionally, under the principles of design simplicity it would also be highly desirable to have such an assembly operate under simplistic mechanical operations utilizing existing design structures.

SUMMARY OF THE INVENTION

It is, therefore, an object of the present invention to provide an automotive seat assembly with an adjustable head restraint assembly. It is a further object of the present invention to provide such an adjustable head restraint assembly wherein adjustment of the head restraint is accomplished automatically by the presence of a center occupant.

An automotive seat assembly is provided including a left rear seat portion including a left rear seat base and a left rear seatback, a right rear seat portion including a right rear seat base and a right rear seatback, and a center rear seat portion including a center rear seat base and a center rear seatback. A head restraint assembly is mounted to the center rear seatback and defines a head restraint protrusion distance above the upper seatback surface. The head restraint assembly is movable between a head restraint operational position and a head restraint stowed position. The head restraint stowed position reduces the head restraint protrusion distance for improved visibility. A convenience feature assembly is formed within the center rear seatback and is movable between a convenience feature stowed position and an convenience feature deployed position. The convenience feature assembly is in communication with the head restraint assembly such that it is moved between the head restraint stowed position and the head restraint operational position in response to the armrest assembly moving between the armrest deployed position and the armrest stowed position.

Other objects and features of the present invention will become apparent when viewed in light of the detailed description of the preferred embodiment when taken in conjunction with the attached drawings and appended claims.

BRIEF DESCRIPTION OF THE DRAWINGS

FIG. 3 is a cross-sectional illustration of the automotive seat assembly illustrated in FIG. 1, the head restraint assembly illustrated in the head restraint deployed position.

FIG. 4 is a cross-sectional illustration of the automotive seat assembly illustrated in FIG. 1, the head restraint assembly illustrated in the head restraint stowed position.

DESCRIPTION OF THE PREFERRED EMBODIMENT(S)

Figure 1:
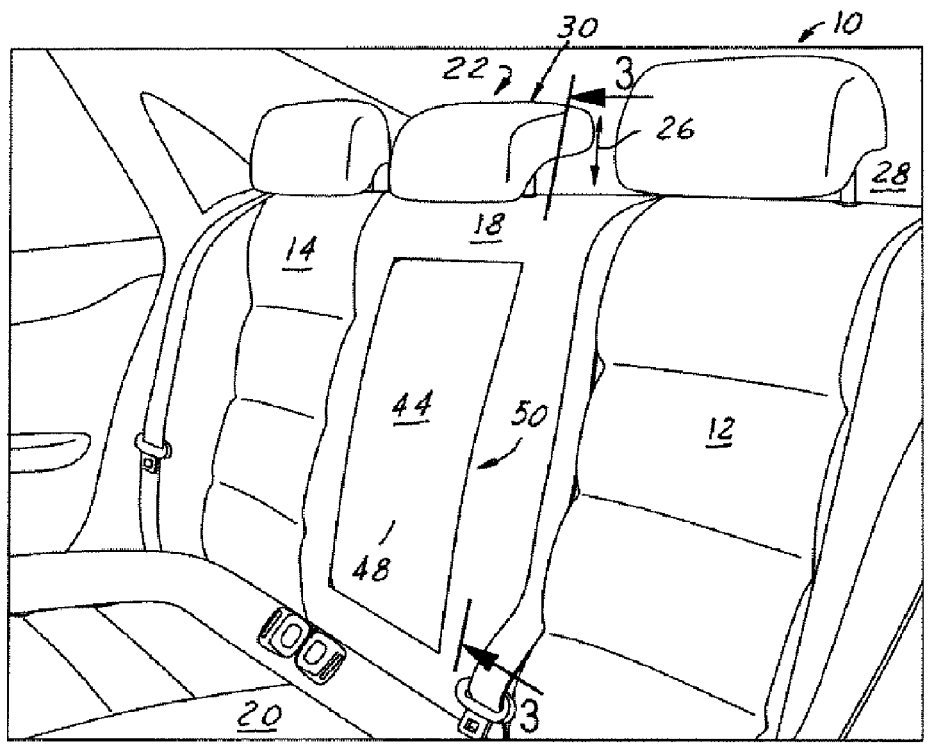
FIG. 1 is an illustration of an automotive seat assembly in accordance with the present invention.
Figure 2:
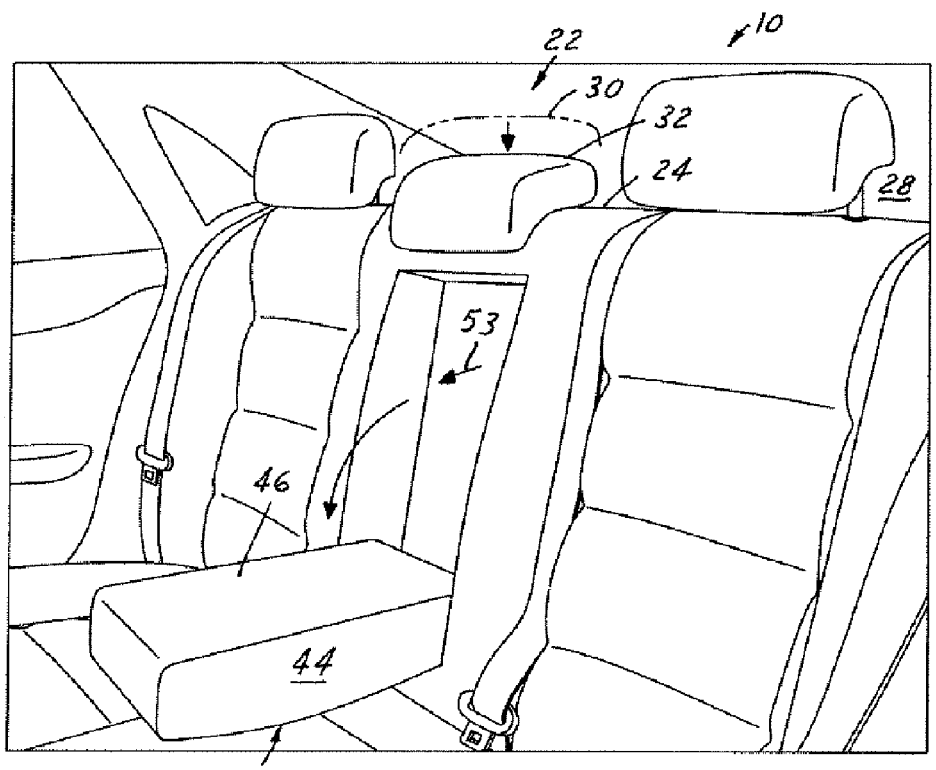
FIG. 2 is an illustration of the automotive seat assembly illustrated in FIG. 1, the head restraint assembly illustrated in the head restraint stowed position.
Figure 6:
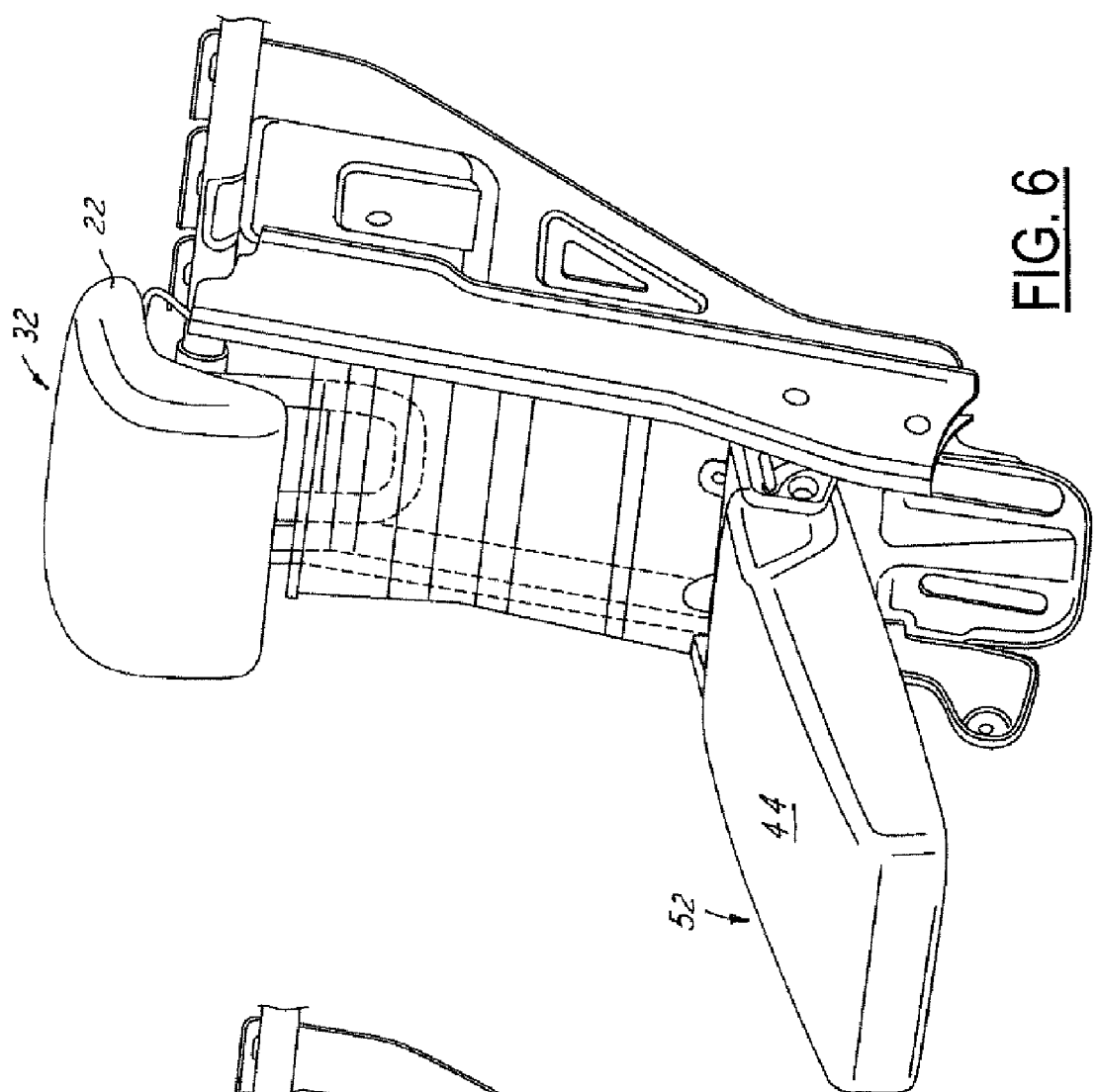
FIG. 6 is an illustration of the automotive seat assembly illustrated in FIG. 4.
Figure 5:
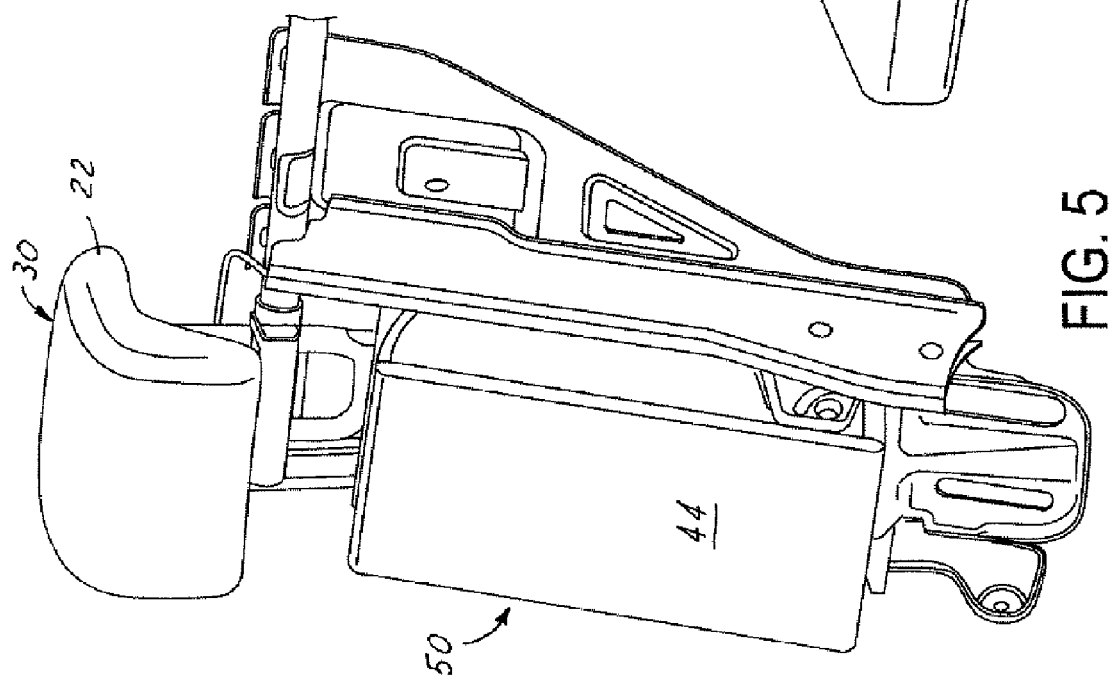
FIG. 5 is an illustration of the automotive seat assembly illustrated in FIG. 3.

Referring now to FIGS. 1 and 2, which are illustrations of an automotive seat assembly 10 in accordance with the present invention. The automotive seat assembly 10 illustrated is intended to encompass a wide variety of seating configurations for rear automotive seats. The seat assembly 10 is illustrated including a left rear seat portion 12, a right rear seat portion 14, and a center rear seat portion 16. The present invention is preferably directed towards implementation within the center rear seat portion 16, although it is contemplated that it could be implemented in a variety of seating positions and arrangements. Each of the seat portions includes a seatback 18 and seatbase 20 as is well understood in the art. A head restraint assembly 22 is used in conjunction with the seatback 18 for further passenger safety and comfort.

Head restraint assemblies 22 commonly extend above the upper seatback surface 24 of the seatback 18. The distance that the head restraint assembly 22 extends may be referred to as the head restraint protrusion distance 26. This head restraint protrusion distance 26 may impair view through a portion of the rear window 28 and thereby reduce a driver's viewing area through the rear view mirror. This is commonly considered an acceptable trade-off for the comfort and safety provided by the head restraint assembly 22. When the center seat portion 16 is not being utilized, however, there becomes no safety or comfort motivation to trade-off. The present invention, therefore, provides for the head restraint assembly 22 to be movable between a head restraint operational position 30 and a head restraint stowed position 32. In the head restraint operation position 30 the head restraint assembly 22 is orientated for safety and comfort. In the head restraint stowed position 32 the head restraint protrusion distance 26 is reduced such that line-of-sight through the rear window 28 is improved.

Figure 8:
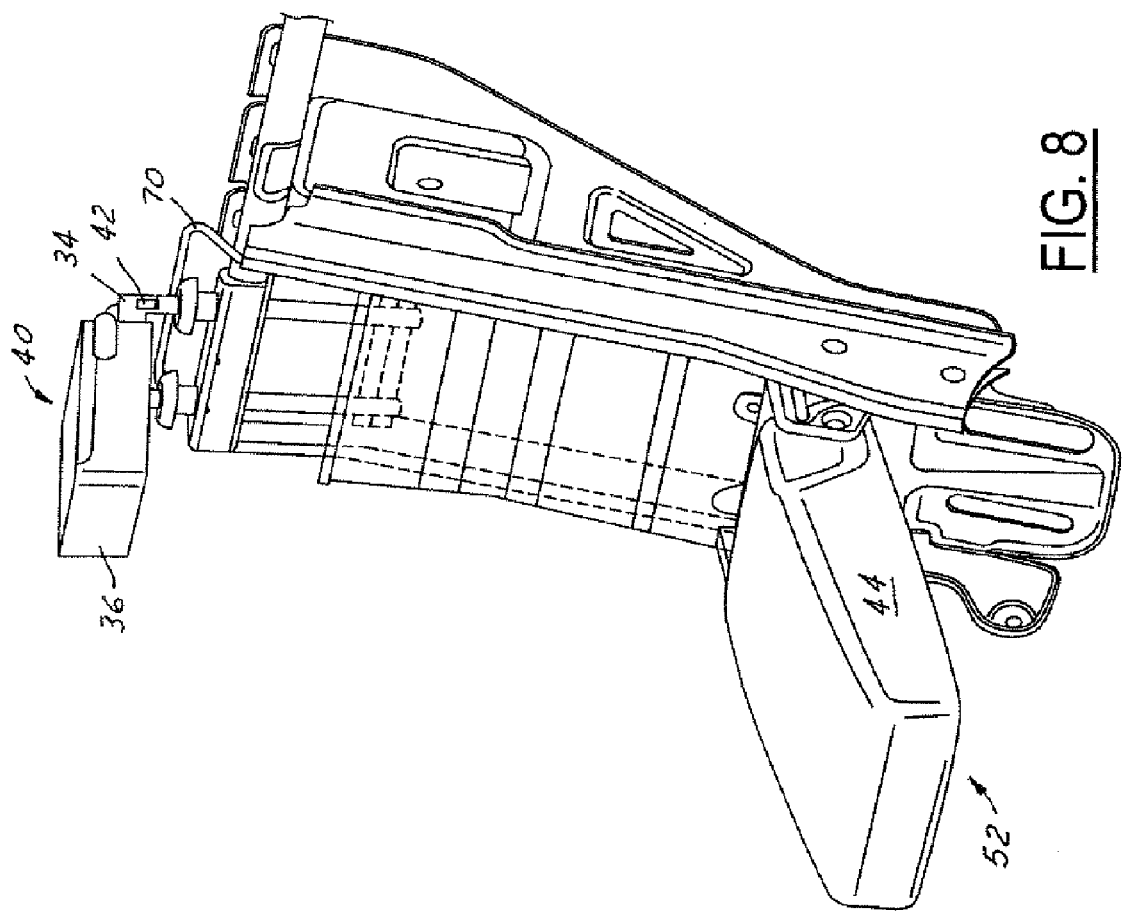
FIG. 8 is an alternate embodiment of the automotive seat assembly illustrated in FIG. 4, the embodiment illustrating a flip-forward configuration.
Figure 7:
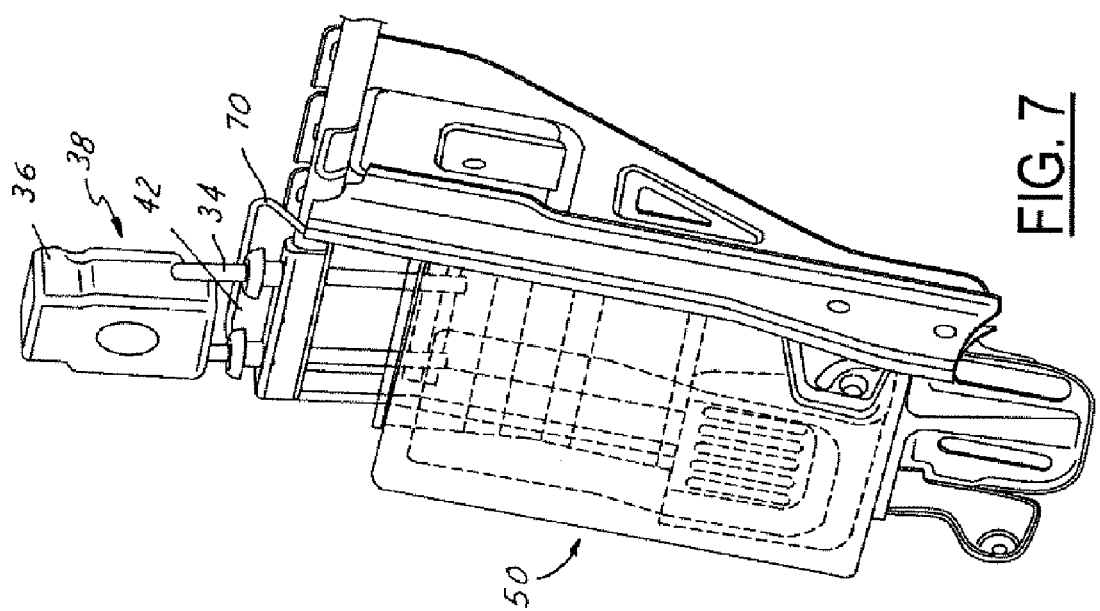
FIG. 7 is an alternate embodiment of the automotive seat assembly illustrated in FIG. 3, the embodiment illustrating a flip-forward configuration.

Movement of the head restraint assembly 22 from the head restraint operational position 30 to the head restraint stowed position 32 is contemplated to encompass a variety of embodiments. In FIGS. 3 through 6, an embodiment is illustrated wherein the head restraint support member 34 mounted through the upper seatback surface 24 is retracted into the seatback 18 to move the head restraint inner structure 36 into the head restraint stowed position 32. In another embodiment illustrated in FIGS. 7 and 8, the head restraint inner structure 36 is rotatably mounted to the head restraint support member 34 and is rotatable between a flip-up position 38 and flip-down position 40 corresponding to the head restraint operational position 30 and the head restraint stowed position 32 respectively. In this embodiment, it is contemplated that the head restraint assembly 22 may be biased towards the flip-down position 40 and may include a trigger element 42 restraining the head restraint assembly 22 in the flip-up position 38. Although two movement methodologies have been disclosed for moving the head restraint assembly 22 between the head restraint operational position 30 and the head restraint stowed position 32, a variety of alternate methodologies would become apparent in light of the present disclosure. Additionally, it is contemplated that the head restraint inner structure 36 may be mounted to the head restraint support member 34 by way of vertical adjustment mounts 43 positioned between the structure 36 and the support 34. This allows occupant adjustment independent of the head restraint assembly 22 movements.

The present invention further includes a novel methodology for controlling movement of the head restraint assembly 22 between these positions. This is accomplished through the use of a convenience features 44 mounted within the seatback 18. Although a variety of convenience features 44 are contemplated, a preferred embodiment contemplates the use of an armrest 44. The armrest 44 is comprised of an armrest upper surface 46 and an armrest lower surface 48. The armrest 44 is movable between an armrest stowed position 50 and an armrest deployed position 52. The armrest lower surface 48 is preferably coincident with the seatback 18 when in the armrest stowed position 50 such that the armrest 44 effectively becomes a portion of the seatback 18. In this fashion, the center seating portion 16 can be utilized for seating when necessary or for providing an armrest 44 when a center occupant is not present.

A unique features of the present invention is that the present invention places the convenience feature (or armrest) 44 in communication with the head restraint assembly 22 such that when the armrest 44 is moved between the armrest deployed position 52 and the armrest stowed position 50, the head restraint assembly 22 is automatically moved between the head restraint stowed position 32 and the head restraint operational position 30. The present invention contemplated automatic movement in a single direction (towards stowed 32 or operational 30) or in both directions. The preferred embodiment contemplated automatic movement into the head restraint stowed position 32. In this fashion, head restraint protrusion distance 26 is automatically decreased by actuation of the armrest 44. A non-actuating motion range 53 is preferably designed into the armrest 44 such that minor movement or incorrect storage will not move the head restraint assembly 22 out of the head restraint operational position 30. In addition, it is contemplated that the head restraint assembly 22 may be manually moved between the head restraint stowed position 32 and the head restraint operational position 30 without regard to armrest 44 positioning as an override feature.

One embodiment of such a communication is illustrated in FIGS. 3 and 4. In this embodiment a pivot mount 54 is mounted to the seatback 18. The armrest 44 is pivotably mounted to the pivot mount 54. The pivot mount 54 further includes a rotational slot guide 56 position near the armrest pivot 58. A pivot arm 60 is also rotationally mounted to the pivot mount 54. An armrest link 62 is positioned within the rotational slot guide 56 and places the armrest 44 in communication with an armrest end 64 of the pivot arm 60. Similarly a head restraint link 66 places the head restraint support member 34 in communication with a head restraint end 68 of the pivot arm 60. Thus as the armrest 44 is rotated into the armrest deployed position 52, the pivot arm 60 is rotated such that the head restraint support member 34 is pulled downwards into the seatback 18. This link assembly 70 connecting the head restraint support member 34 to the armrest 44 is only one contemplated embodiment. Other embodiments contemplate that the link assembly 55 may be formed from a variety of linkages including but not limited to cables. In the embodiment illustrated in FIGS. 7 and 8, the link assembly 55 may simply be in communication with the trigger element 42 such that the head restraint inner structure 36 is released to move into the flip-down position 40.

While particular embodiments of the invention have been shown and described, numerous variations and alternative embodiments will occur to those skilled in the art. Accordingly, it is intended that the invention be limited only in terms of the appended claims.

What is claimed is:

1. An automotive seat assembly comprising:
   a seat base;
   a seatback including an upper seatback surface;
   a head restraint assembly mounted to said seatback and defining a head restraint protrusion distance above said upper seatback surface, said head restraint assembly movable between a head restraint operational position and a head restraint stowed position, said head restraint stowed position reducing said head restraint protrusion distance;
   an armrest assembly mounted to said seatback, said armrest assembly movable between an armrest stowed position and an armrest deployed position, said armrest assembly in communication with said head restraint assembly such that said head restraint assembly is moved between said head restraint stowed position and said head restraint operational position in response to said armrest assembly moving between said armrest deployed position and said armrest stowed position;
   wherein said head restraint assembly is movable between said head restraint operational position and said head restraint stowed position independent of a position of said armrest assembly as an override feature.

2. An automotive seat assembly as described in claim 1, wherein said armrest assembly includes a non-actuating motion range allowing partial movement of said armrest assembly without moving said head restraint assembly.

3. An automotive seat assembly as described in claim 1, further comprising:
a head restraint support member protruding from said upper seatback surface, said head restraint support member retracting into said seatback when said head restraint assembly is moved into said head restraint stowed position.

4. An automotive seat assembly as described in claim 1, wherein said head restraint assembly comprises:
a head restraint support member protruding from said upper seatback surface; and
a head restraint inner structure rotatably mounted to said head restraint support member, said head restraint inner structure rotatable between a flip-up position and a flip-down position, said flip-down position corresponding to said head restraint stowed position.

5. An automotive seat assembly as described in claim 1, further comprising:
at least one vertical adjustment mount in communication with said head restraint assembly.

6. An automotive seat assembly as described in claim 1, wherein said head restraint assembly is automatically moved to said head restraint stowed position in response to said armrest assembly moving into said armrest deployed position.

7. An automotive seat assembly as described in claim 1, further comprising:
a trigger element holding said head restraint assembly in said head restraint operation position, said head restraint assembly biased towards said head restraint stowed position; and
a link element between said armrest assembly and said trigger element, said link element releasing said trigger element when said armrest assembly is moved into said armrest deployed position.

8. An automotive seat assembly as described in claim 1, further comprising:
a link assembly providing communication between said armrest assembly and said head restraint assembly, said link assembly comprising:
a pivot mount including a rotational slot guide, said armrest assembly pivotably mounted to said pivot mount;
an armrest link mounted to said armrest assembly, said armrest link positioned within said rotational slot guide;
a pivot arm rotational mounted to said pivot mount, said pivot arm including an armrest end and a head restraint end, said armrest link in communication with said armrest end;
a head restraint link providing communication between said head restraint assembly and said head restraint end;
wherein when said armrest assembly is rotated into said armrest deployed position, said pivot arm is rotated such that said head restraint link is pulled downwards towards said seatbase.

9. An automotive head restraint assembly as described in claim 1, further comprising:
a link assembly providing communication between said armrest assembly and said head restraint assembly, said link assembly providing communication such that as said armrest assembly is rotated into said armrest deployed position said head restraint assembly is pulled downwards towards said seatbase.

10. An automotive seat assembly comprising:
a left rear seat portion including a left rear seat base and a left rear seatback;
a right rear seat portion including a right rear seat base and a right rear seatback;
a center rear seat portion including a center rear seat base and a center rear seatback, said center rear seatback including an upper seatback surface and defining a right rear seatback plane;
a head restraint assembly mounted to said center rear seatback and defining a head restraint protrusion distance above said upper seatback surface, said head restraint assembly movable between a head restraint operational position and a head restraint stowed position, said head restraint stowed position reducing said head restraint protrusion distance;
a convenience feature assembly formed within said center rear seatback, said convenience feature assembly movable between an convenience feature stowed position and an convenience feature deployed position, said convenience feature assembly in communication with said head restraint assembly such that said head restraint assembly is moved between said head restraint stowed position and said head restraint operational position in response to said convenience feature assembly moving between said convenience feature deployed position and said convenience features stowed position;
a trigger element holding said head restraint assembly in said head restraint operation position, said head restraint assembly biased towards said head restraint stowed position; and
a link element between said convenience feature assembly and said trigger element, said link element releasing said trigger element when said convenience feature assembly is moved into said convenience feature deployed position;
wherein said head restraint assembly comprises:
a head restraint support member protruding from said upper seatback surface; and
a head restraint inner structure rotatably mounted to said head restraint support member, said head restraint inner structure rotatable between a flip-up position and a flip-down position, said flip-down position corresponding to said head restraint stowed position, said flip-down position placing said head restraint inner structure parallel to said convenience feature.

11. An automotive seat assembly as described in claim 10, wherein said convenience feature assembly comprises an armrest assembly.

12. An automotive seat assembly as described in claim 10, further comprising:
a head restraint support member protruding from said upper seatback surface, said head restraint support member retracting into said center rear seatback when said head restraint assembly is moved into said head restraint stowed position.

13. An automotive seat assembly as described in claim 10, wherein said head restraint assembly is automatically moved into said head restraint operational position in response to said convenience feature assembly moving into said armrest stowed position.

14. An automotive seat assembly as described in claim 10, further comprising:

a link assembly providing communication between said convenience feature assembly and said head restraint assembly, said link assembly comprising:

a pivot mount including a rotational slot guide, said convenience feature assembly pivotably mounted to said pivot mount;

an convenience feature link mounted to said convenience feature assembly, said convenience feature link positioned within said rotational slot guide;

a pivot arm rotational mounted to said pivot mount, said pivot arm including an convenience feature end and a head restraint end, said convenience feature link in communication with said convenience feature end;

a head restraint link providing communication between said head restraint assembly and said head restraint end;

wherein when said convenience feature assembly is rotated into said convenience feature deployed position, said pivot arm is rotated such that said head restraint link is pulled downwards towards said seatbase.

15. A method of reducing visibility impairment from a head restraint assembly comprising:

mounting a convenience feature assembly to a seatback portion of a seat assembly, said convenience feature assembly movable between an convenience feature stowed position and an convenience feature deployed position, said seatback portion unoccupiable when said convenience feature is in said convenience feature deployed position;

placing a head restraint assembly in communication with said convenience feature assembly, said head restraint assembly defining a head restraint protrusion distance above an upper seatback surface of said seatback portion, said head restraint assembly movable between a head restraint operational position and a head restraint stowed position, said head restraint stowed position reducing said head restraint protrusion distance, said head restraint assembly moving into said head restraint stowed position in response to said convenience feature assembly moving into said convenience feature deployed position;

rotating a head restraint inner structure into a flip-down position in order to move said head restraint assembly into said head restraint stowed position, said flip-down position placing said head restraint inner structure parallel to said convenience feature;

wherein reduction of said head restraint protrusion distance improves visibility.

* * * * *